United States Patent [19]

Schaal et al.

[11] Patent Number: 5,158,047
[45] Date of Patent: Oct. 27, 1992

[54] DELAYED DROP POWER STROKE INTERNAL COMBUSTION ENGINE

[76] Inventors: Jack E. Schaal, P.O. Box 206, Island Lake, Ill. 60042; Robert G. Schaal, P.O. Box 65, Merrimac, Wis. 53561

[21] Appl. No.: 524,087

[22] Filed: May 14, 1990

[51] Int. Cl.⁵ .............................................. F02B 75/32
[52] U.S. Cl. ................................. 123/78 BA; 123/197.4
[58] Field of Search .......... 123/197 AC, 48 B, 78 BA

[56] References Cited

U.S. PATENT DOCUMENTS

| | | | |
|---|---|---|---|
| 1,553,009 | 9/1925 | Stuke | 123/78 R |
| 3,686,972 | 8/1972 | McWhorter | 123/197 AC |
| 3,693,464 | 9/1972 | Wieckmann | 123/197 AC |
| 3,861,239 | 1/1975 | McWhorter | 123/197 AC |
| 3,886,805 | 6/1975 | Koderman | 123/197 AC |
| 4,254,743 | 3/1981 | Reid et al. | 123/197 AC |
| 4,467,756 | 8/1984 | McWhorter | 123/197 AC |
| 4,966,043 | 10/1990 | Frey | 123/197 AC |

FOREIGN PATENT DOCUMENTS 25470 of 1910 United Kingdom ............ 123/78 BA

Primary Examiner—David A. Okonsky

[57] ABSTRACT

This invention is designed to increase the net engine efficiency of four body linkage mechanisms used to generate power or do useful work. This is accomplished by decreasing the piston velocity in the first half of the power stroke of a typical engine cycle. The piston velocity is altered by the addition of three components at the crankarm pin location on the crankshaft. The new components convert a normal engine from a four body to a five body linkage mechanism. One component is an eccentric pin and the other two are an internal ring and pinion gear assembly that indexes and rotates the eccentric pin in a fixed relationship with the crankshaft rotation. The pinion gear and eccentric pin are integral and rotate together as a single part in a direction opposite to the crankshaft rotation. The outer eccentric diameter moves up as the crankarm moves down during the first part of the power stroke. This action decreases the piston velocity and allows more time for the cylinder pressure to increase while the cylinder chamber is still small. This results in higher cylinder pressures that act over a larger crankarm arc.

3 Claims, 2 Drawing Sheets

DELAYED DROP POWER STROKE INTERNAL COMBUSTION ENGINE

BACKGROUND

1. Field of Invention

This invention relates in general to machines and engines that use the four body linkage mechanism to generate power or to do useful work, and in particular, to devices that modify the movement of the four body linkage (piston, connecting rod, crankshaft and cylinder/crankcase block) used to generate and transfer power in the internal combustion engine.

2. Description of Related Art

It is widely known that, at maximum pressure and temperature, the combustion process that occurs in the typical internal combustion engine is incomplete. The maximum thermal efficiency varies from 45-50% at peak output levels and often averages only 25% for a normal driving cycle. This includes both spark-ignition and compression-ignition engines. Basically, there are only two ways to improve engine efficiency: alter the fuel/air mixture, or alter the geometry of the linkage that is used to generate and transfer the work created during the combustion phase. You can force more fuel and air into the cylinder chamber using a turbo or supercharger and increase power, but the efficiency still remains low. Some improvements have been made using cleaner single compound fuels, like propane or alcohol, or by altering the mixture (carburetors), or fuel flow patterns (valves, cams, etc.), but the total improvements made by all these fuel/air changes have only increased engine efficiency by several percent in the past sixty years. The introduction of higher compression ratio engines is one major geometrical improvement that has occurred in this time span.

The poor thermal utilization of the internal combustion engine occurs primarily as a result of the geometry of the combustion chamber. The chamber shape is a cylinder with flattened ends. One end (head) is stationary and the other (piston) is free to move up and down. Minor variations have been tried on the shape of the end faces with only minimal success.

Our patent search turned up 45 different ideas using eccentric pin, gears and/or cams, and levers that were used in an attempt to alter the linkage movement. Only one of these claims (Stuke U.S. Pat. No. 1,553,009) made an attempt to change the vertical movement of the piston in an effort to increase the power output. Stuke used the mechanism as drawn in his patent in a context that contradicts his claim. A fractional gear ratio (2.72:1) was drawn in the Stuke patent, which takes 25 revolutions of the crankarm to repeat the stroke curve. Refer to Appendix A in our enclosed reference document "Delayed Drop Power Stroke— Five Body Linkage Mechanism" for a detailed examination and discussion of the Stuke patent.

The rest of the patents we looked at made attempts to alter the crankshaft action or to vary the stroke and/or compression ratio. Both the claims and mechanisms differ from those of our invention. None of them have succeeded in improving the mechanical or thermal efficiency of the internal combustion engine, except marginally. They are generally too complex to build economically. A complete list of the patents we examined is given in our attached reference document. Only one other patent had any relevancy to our claim (McWhorter U.S. Pat. No. 3,686,972). McWhorter recognized the importance of piston velocity, but he did not have the correct mechanism.

We contend that the moving piston is the major cause of the low efficiency obtained in the internal combustion engine. A large part of the engine inefficiency occurs because the piston is moving down, at an accelerating rate, as the fuel is combusted. The combustion chamber is being enlarged by the rotating linkage at the same time that the combustion force is being generated.

The time increment available to create a force that will sustain itself on the dropping piston and increase its momentum is very small. The crankarm angle increases 5° every 200 micro-seconds (0.0002) at a rated speed of 4166 rpm. Ignition is typically initiated in spark-ignition engines at 20°-25° before top dead center (TDC) at rated speed and peak cylinder pressures occur between 5°-15° after TDC (see SAE reports 700064, 760645, 830334 and 852067), which means a 25°-40° crankarm arc is traversed from the start of ignition to peak pressure levels in 0.0010-0.0016 seconds at 4166 rpm. Diesel characteristics are different than the above numbers, but they also require small time increments.

Because it occurs in an expanding chamber after TDC is passed, the maximum pressure possible is reduced as the piston drops. The combustion force cannot sustain itself long enough on the piston to overcome the pressure drop created by the expanding chamber volume as the piston falls. Chamber volume percentage changes increase as the compression ratio goes up. When the combustion force contacts the piston, it cases the piston to accelerate downward at a faster rate than that generated by the momentum of the moving parts. The net effects of the rapidly expanding chamber also tends to create disruptive, vacuum type, flows in the pressure waves that are created.

If a mechanism can be installed to retard the piston from moving downward, thus slowing the velocity of its descent, over a crankarm rotation large enough to allow more combustion to occur in a chamber whose volume has been expanded by a minimal amount (less than the four body linkage), higher cylinder pressures will be achieved, along with better fuel combustion. More time and a smaller chamber will exist to generate a larger force acting on the piston. Torque output should increase.

SUMMARY OF INVENTION

Our geared eccentric pin decreases the piston variety as the piston moves down in the cylinder chamber through that part of the power stroke where combustion occurs. The piston velocity then begins to change rapidly and accelerates after the combustion phase ends. The piston moves down at a rate faster than that of a conventional four body linkage through the latter half of the power stroke. The piston velocity slows down again as it approaches the point in the engine cycle at which the exhaust ports are opened. The piston velocity is defined as the movement of the piston, in feet per second, at any point in its vertical travel up and down the cylinder chamber. Our invention minimizes the expansion of the combustion chamber volume until the fuel supply has been more fully combusted, which should increase the power output and thermal efficiency of the internal combustion engine.

DETAILED DESCRIPTION

Figure 1:
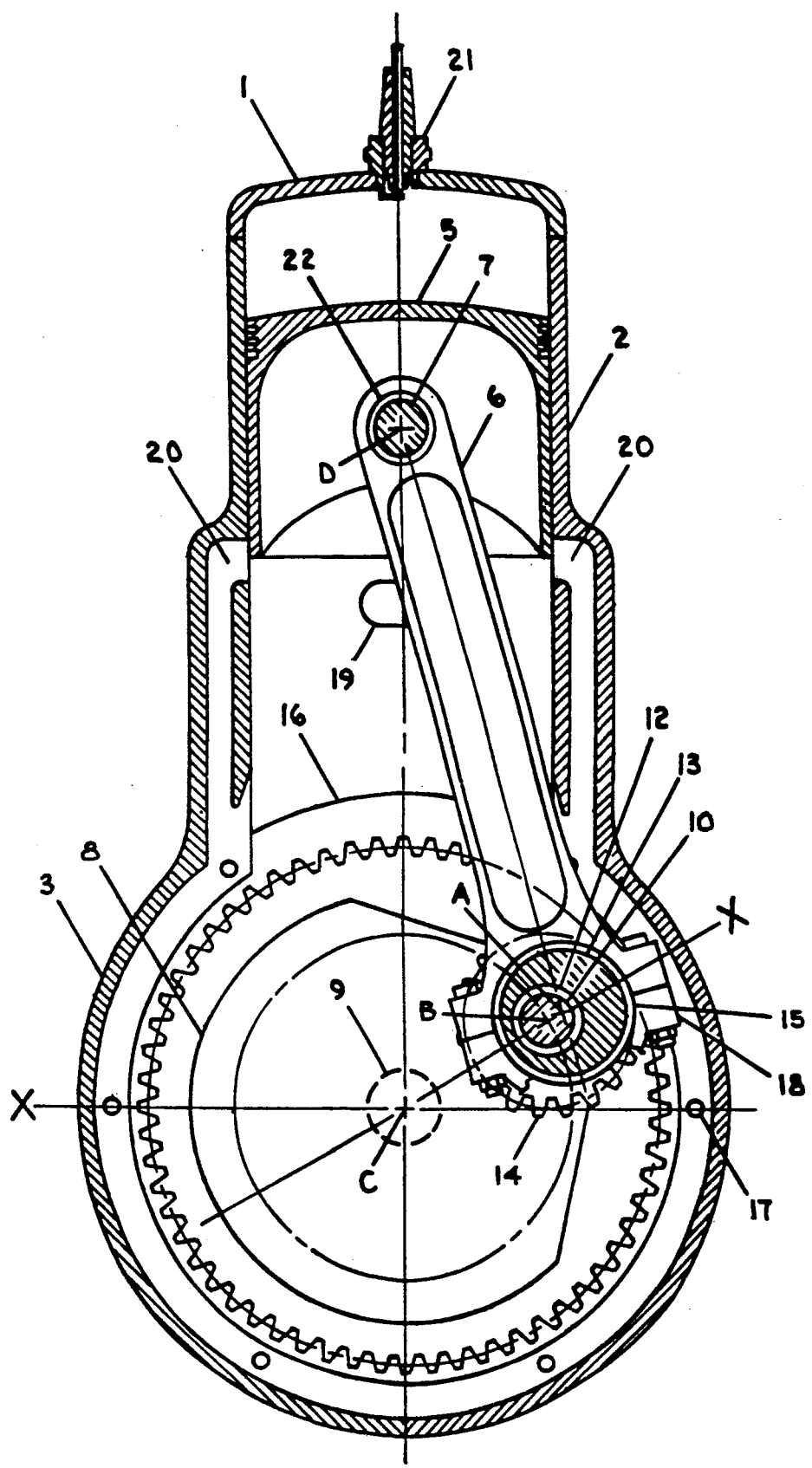
FIG. 1 shows a transverse view of a typical four body linkage mechanism (piston, connecting rod, crankshaft and cylinder/crankcase block) with a ring gear, pinion gear and eccentric pin added to the mechanism at the crankarm pin location, which converts the linkage into a five body mechanism. A 3:1 gear ratio is shown with a 10% offset and the crankarm is drawn at a position of 60° after TDC. The offset length is set at the vertical/-down position at TDC and is expressed as a percentage of the crankarm length.
Figure 2:
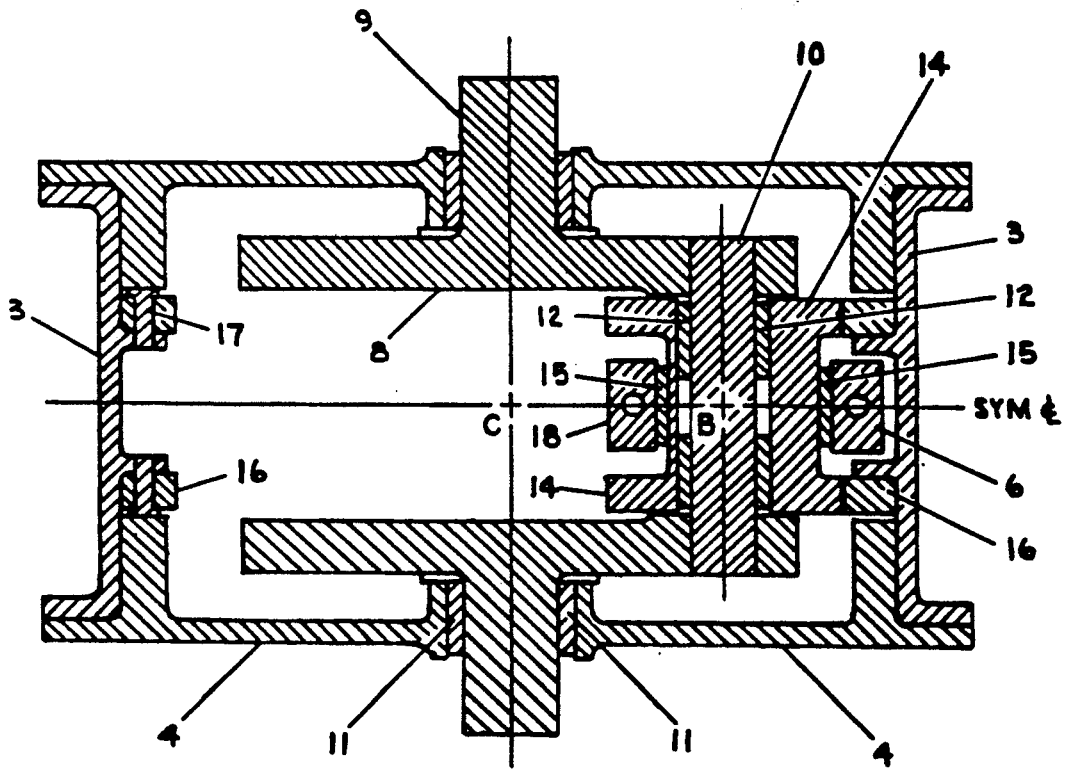
FIG. 2 is a sectional view taken along line X—X to show the arrangement of the eccentric pin and gears in relation to the rest of the mechanism.

The preferred arrangement of the invention is shown in FIGS. 1 and 2. A five body linkage mechanism is created by adding three new components to the normal four body linkage used to generate power in the internal combustion engine. The moving parts are enclosed by a cylinder head 1, a cylinder chamber 2, a crankcase 3, and a pair of cover plates 4, which are assembled together as a single unit referred to as the cylinder/crankcase block assembly.

A piston 5 moves up and down vertically in the cylinder chamber 2 and actuates a connecting rod 6. A wrist pin 7 and a wrist pin bearing 22, whose centers are located at point D, connect the piston 5 to the connecting rod 6. The lower end of the connecting rod 6 rotates a three piece crankshaft around its central axis, which is designated as point C, in FIG. 1. The crankshaft is comprised of a pair of crankarms 8, a driveshaft 9, and a crankarm pin 10, whose ends are press fit into a hole in each crankarm 8. The center of the holes and crankarm pin 10 are labeled point B. The driveshaft 9 extends through a hole in each cover plate 4 and is supported by a bearing 11 as shown in FIG. 2. The bearing 11 supports the rotatable crankshaft in the crankcase block assembly.

The crankarm pin 10 has a bearing 12, an eccentric pin 13, and two pinion gears 14 slipped on over its outer diameter before it is pressed into the holes on the crankarms 8. The eccentric pin 13 is located between each pinion gear 14 as shown in FIG. 2. The eccentric pin 13 and pinion gears 14 are made from a single piece of hobbed gear stock and act together as a single unit. The pinion gears 14 are centered on the crankarm pin center, point B. The center of the outer diameter of the eccentric pin 13 is located at point A as shown in FIG. 1 and rotates eccentrically around the crankarm pin 10.

A split bearing 15 is installed around the eccentric pin 13. The connecting rod 6 and rod end cap 18 are assembled as shown in FIG. 1, and connect the eccentric pin 13 and split bearing 15 to the connecting rod 6. The center of the split bearing 15 is located at point A.

The eccentric pin 13 requires something to turn it and keep it in sequence with the crankshaft rotation so that each revolution of the eccentric pin 13 has a fixed relationship with the crankarm 8. Rotation and indexing of the eccentric pin 13 are accomplished by adding a pair of stationary ring gears 16 that are centered on the crankshaft center at point C. The pinion gears 14 mesh with and rotate along the track of the ring gears 16. The rings gears 16 are mounted inside the crankcase 3 as shown in FIGS. 1 and 2. Several lock pins 17 are installed to attach the ring gear 16 rigidly to the crankcase 3.

When the mechanism is actuated by a power source, the action generated by the eccentric pin 13 alters the movements at the lower end of the connecting rod 6, which is turn alters the movement of the piston 5 as it moves up and down in the cylinder chamber 2. The operation of the mechanism begins when a fuel/air mixture is put into the cylinder chamber 2 above the piston 5 and it is ignited by a spark plug 21. Ignition is initiated 6°-25° before the piston reaches its maximum upward position at TDC, depending upon the speed at which the linkage is rotating. The faster the rotation, the more the ignition point is advanced.

When the bottom of the piston is above the inlet port 19, the fuel/air mixture enters the crankcase chamber. When the piston 5 tops out and moves down, it blocks off the inlet port 19 and compresses the fuel/air mixture in the crankcase chamber, forcing it up into the transfer port passages. As the piston 5 nears the bottom of its maximum stroke, the exhaust port (not shown) is uncovered first and the exhaust gases are expelled. Then the transfer ports 20 are uncovered and the pressurized fuel/air mixture enters the combustion chamber. When the piston 5 bottoms out and moves up, the transfer ports 20 and exhaust port are blocked off. As the piston 5 moves up the inlet port 19 is uncovered again when the bottom of the piston 5 rises above it. The crankshaft completes one full revolution when the piston reaches TDC and the aforementioned action repeats itself for each new revolution of the crankshaft.

When the crankarm rotates clockwise, the eccentric pin 13 is rotated counterclockwise by the pinion gears 14 as they roll along inside the ring gears 16. The eccentricity of the eccentric pin 13 is referred to as the offset length, which is the distance from point A to point B.

The vertical drop of the piston 5 in the cylinder chamber 2 is the net sum of the changes that occur in the vertical movements of the connecting rod 6, crankarm pin 8, and eccentric pin 13 at each crankarm angle as the crankarm 8 rotates around point C. As the crankarm 8 rotates clockwise past TDC during the first part of the power stroke, point B rotates outward and downward as the crankarm angle increases. Point A is directly under point B at TDC on the vertical centerline of the engine, and it rotates counterclockwise around point B. Point A rotates upward and outward around point B for the first 90° arc of the eccentric pin 13 relative to point C. The vertical component of the offset length AB moves opposite to that of the crankarm's vertical component.

The offset length AB and its position at TDC must always produce a change in the eccentric pin's upward movement that does not exceed the net change in the downward movements of the crankarm and connecting rod lengths for any given crank angle rotation through the first half revolution of the eccentric pin 13 after TDC, relative to point C. The smaller you can make this difference, the more you can slow the velocity (drop) of the piston 5. The net effect is to slow the velocity of the piston 5 across the top portion of the stroke from 60° before TDC to 60° after TDC.

The decreased piston velocity allows the power generation phase to take place in a smaller, more uniform sized chamber, which expands at a decreased rate, over a longer crankarm arc than what normally occurs in the four body linkage mechanism.

Point A moves upward and inward as it rotates around point B for the second 90° arc traversed by the eccentric pin 13 relative to point C. The delayed drop effect decreases as the eccentric pin 13 nears the top of its arc and becomes zero at 180°, which is one half of a revolution of the eccentric pin relative to point C.

The sequence is reversed for the second half of the eccentric pin revolution. The vertical components of the offset length AB and crankarm 8 are both downward and add together. The piston velocity begins to accelerate downward. The additive effect of the eccentric pin 13 peaks at three quarters of a revolution of the eccentric pin 13 relative to point C, then starts to decrease until the eccentric pin 13 completes one full revolution. This means that after the upward movement of the eccentric pin's outer diameter peaks, the eccentric pin's rotation causes its outer diameter to move down, along with the crankarm pin 10, which results in the piston 5 moving down in the cylinder chamber 2 at a faster velocity than what normally occurs during the latter part of the power stroke in the four body linkage mechanism.

Figure 3:
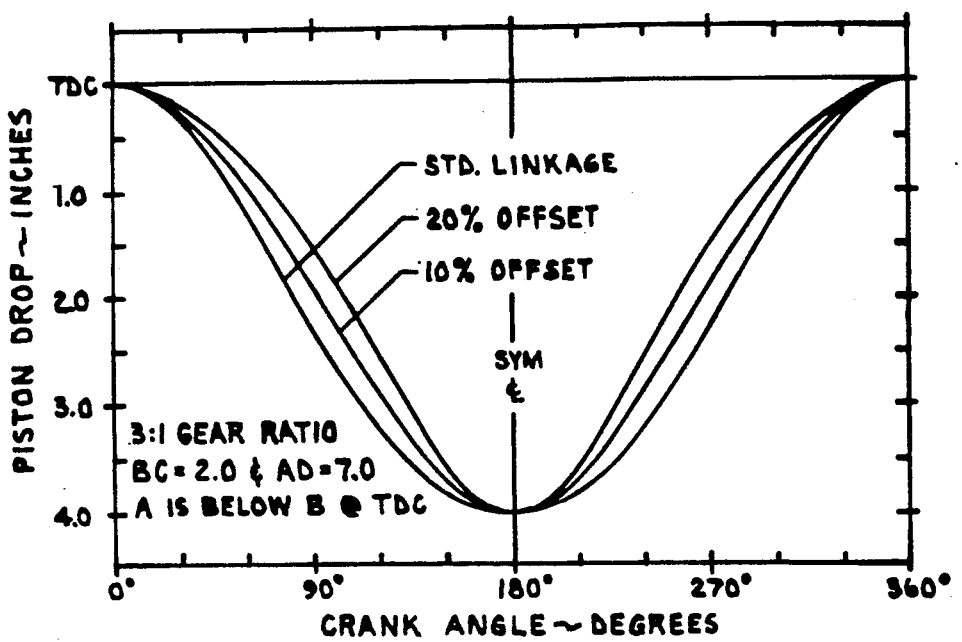
FIG. 3 shows several typical stroke curves (piston drop versus crank angle) for a complete crankarm revolution using a 3:1 gear ratio and several different offset lengths. It also includes a curve for the normal four body linkage, so that differences in the vertical piston drop can be visually compared.

Because the eccentric pin 13 and crankarm 8 are rotating at different speeds, the net effects on the piston movement vary, depending upon which part of the engine cycle is being generated. Each viable gear ratio has its own distinctive character and creates a different stroke curve. The curve can be altered considerably by changing the offset length and its position at TDC at the start of the engine cycle. A typical example of a stroke curve for a full crankshaft revolution is shown in FIG. 3 using a 3:1 gear ratio and several different offset lengths. A stroke curve for an equivalent four body linkage having the same maximum stroke is also shown so the differences can be perceived visually.

The five body linkage with a 3:1 gear ratio has the same average piston velocity as the four body linkage because the maximum strokes are the same length. What is changed is the instantaneous piston velocity as it moves up and down in the cylinder chamber 2. It is reduced considerably when the crankarm 8 goes from 60° before TDC to 60° after TDC. Then it is increased at a faster rate than normal until it nears the bottom of the power stroke. The instantaneous piston velocity then decreases quickly, staying slightly above normal until it reaches zero at the bottom of the stroke, where the piston movement reverses and the upward stroke retraces the downward velocities back up to TDC. The VARIABILITY of the stroke is REDUCED through the combustion phase of the power stroke and then INCREASED through the rest of the power stroke.

A major problem inherent in the four body linkage is the unbalanced mass of the reciprocating piston and the sideways movement of the connecting rod mass as the linkage is rotated. The inertial forces exerted on the rest of the engine are a function of both weight and speed. They increase at exponential rates as the speed is increased. These forces are usually compensated for by adding balance weights (mass) to the crankarms 8 and/or a tuned dynamic balancer to the front end of the driveshaft 9.

The addition of the eccentric pin 13 to the linkage changes both the inertial and dynamic effects on the rest of the mechanism. The eccentricity of the eccentric pin 13 adds a third unbalanced mass-moment to the mechanism. This third mass-moment is rotating in a direction OPPOSITE to both the piston's movement at the top of the stroke and the connecting rod's sideways movement at 90° after TDC. The eccentric pin's mass is also rotating at a speed greater than the crankarm 8, which is a function of the gear ratio used. The eccentric pin's mass-moment can also be increased or decreased by changing the length of the offset. Its net affect is to reduce the peak inertial forces generated at the crankarm pin 10 when the piston 5 approaches and passes TDC. The eccentric pin 13 thus acts as a partial inertial balancer by cancelling out some of the unbalanced mass of the piston 5 and connecting rod 6.

A second major problem encountered when using a four body linkage at high crankshaft speeds is the dynamic response of the rotating parts and their effect on the "U" shaped bend in the crankshaft, which is required to accommodate the connecting rod 6. The centrifugal forces created by the high speeds of the crankshaft, coupled with the resonant frequencies induced by the unbalanced rotating masses, require a stiff crankshaft design with short crankarms 8. Allowable crankshaft deflections induced by the dynamic conditions are critical and are a major cause of crankshaft failures.

The pinion gears 14 and ring gears 16 that are added in our five body mechanism help alleviate this condition regarding excessive crankshaft deflections. As the crankshaft speed increases, the pinion gears 14 are pressed tighter against the ring gears 16. When all of the tolerances existing in the pins, gears, and bearings are taken up by the induced strains from the dynamic forces, the fixed ring gears 16 prevent the crankarm pin 10 from moving outward any further when the crankshaft speed is increased beyond this tolerance point. The contact of the meshing teeth also creates a different harmonic (noise), one that is at a lower frequency than what normally occurs in the four body linkage mechanism. The geometrical arrangement of the five body linkage thus acts as a partial harmonic damper.

The internal combustion engine has three objectionable compounds being expelled out of the exhaust system, which are nitrous oxides ($NO_x$), carbon monoxide (CO), and hydrocarbons (HC). The two cycle spark-ignition engine depicted in FIG. 1 ejects a large amount of hydrocarbon particles from two main sources: 1) incomplete combustion, and 2) leakage of raw fuel across the top of the piston 5 when it is at the bottom of the stroke and both the exhaust port and the transfer ports 20 are open at the same time.

Our five body linkage concept reduces the hydrocarbon exhaust emissions in three different ways. The more uniform combustion chamber that exists over a wider crankarm arc promotes more complete combustion of the fuel charge in the cylinder chamber 2. More hydrocarbon particles are chemically transformed into water ($H_2O$), carbon dioxide ($CO_2$), and other gas compounds. The increased power resulting from the increased cylinder pressures also allows a reduction to be made in the initial charge of fuel. Because less fuel is now required to generate the same amount of power, a leaner gas mixture can be used.

A third decrease in hydrocarbon emissions occurs because the five body linkage concept reduces the amount of raw fuel leakage out the exhaust when the piston 5 is at the bottom of the stroke. The amount of leakage of raw, unburned fuel, is as high as 30% of the fuel charge injected into the cylinder chamber 2 (see SAE Reports 730159 and 780642). Our linkage mechanism has decreased the piston dwell at the bottom of the stroke by as much as 25% over the normal four body linkage shown in FIG. 3. The exhaust port and transfer ports 20 are both open during the last half inch drop of the piston 5, but the time interval when leakage occurs is reduced by 25%, which should reduce the escaping volume of fuel by 25% if the flow rates remain the same.

Thus, the five body linkage mechanism reduces the hydrocarbon emissions by decreasing the amount of raw fuel expelled, reduces the initial charge (leaner mixture), and combusts the fuel charge that is ignited more fully.

The foregoing description of the preferred embodiment of the invention has been presented for the purpose of illustration. It is not intended to be exhaustive or to limit the invention to the precise form disclosed. Modifications and variations are possible within the context given. It is intended that the scope of the invention not be limited by this detailed description, but by the claims appended to it.

Variations in particular dimensions, orientation of parts, and gear design must meet the following parameter: the piston should not be moved upward when the combustion force exceeds the upward momentum force generated by the rotating linkage during the power stroke portion of the engine cycle.

An example of the variation that is possible would be the use of a 4:1 gear ratio and a 10% offset, with the offset length AB located 30° to the left of the vertical/down position when the crankarm 8 is at TDC. (See page 71 of our reference document.) This arrangement causes the piston 5 to peak at 10° before TDC, at which point it starts to drop at a slowed rate, crosses TDC at its normal height and then continues down at a slowed rate until the outer diameter of the eccentric pin 13 peaks and starts to accelerate the piston 5 downward. This is opposite to what Stuke tried to do in his patent. He had the piston peaking after, not before, TDC.

Another possible variation would be the use of a 2:1 gear ratio and a 15% offset, with the offset length AB located vertical and down when the crankarm 8 is at TDC. (See page 60 of our reference document.) This arrangement shortens the maximum stroke at 180° after TDC when compared to the standard four body linkage. The displacement can be restored by using a longer crankarm 8. This results in a modified linkage which has both a piston drop effect and a longer crankarm 8. The longer crankarm 8 will generate a higher torque than that of an equivalent displacement four body linkage mechanism, in addition to the delayed drop benefits that occur.

We claim:

1. An engine comprising a block assembly, a rotatable crankshaft mounted to the block assembly, said crankshaft comprising a driveshaft, crankarm(s) and crankarm pin, a stationary ring gear concentric with the axis of the driveshaft and rigidly attached to the block assembly, a rotatable pinion gear mounted concentrically on the crankarm pin, said pinion gear meshing with the stationary ring gear, a rotatable eccentric mounted on the crankarm pin and rigidly attached to the pinion gear, said eccentric and pinon gear rotating tougher in a direction opposite to the crankarm rotation, a cylinder having a central axis, a piston reciprocating in said cylinder, a connecting rod with one end rotatably mounted to the piston by a wristpin and the other end rotatably mounted on the eccentric by a rod end cap, were said gears and eccentric comprises a means for decreasing the combustion chamber volume available to the cylinder gases that drive the piston as the piston approaches and passes the minimum volume position during the combustion phase of the engine cycle, said minimum volume position of the piston occurring when crankarm and connecting rod central axes are coplanar with the cylinder axis when viewed in cross section along the crankshaft axis.

2. An engine comprising a block assembly, a rotatable crankshaft mounted to the block assembly, said crankshaft comprising a driveshaft, crankarm(s) and crankarm pin, a stationary ring gear concentric with the axis of the driveshaft and rigidly attached to the block assembly, a rotatable pinion gear mounted concentrically on the crankarm pin, said pinion gear meshing with the stationary ring gear, a rotatable eccentric mounted on the crankarm pin and rigidly attached to the pinion gear, said eccentric and pinon gear rotating together in a direction opposite to the crankarm rotation, a cylinder having a central axis, a piston reciprocating in said cylinder, a connecting rod with one end rotatably mounted to the piston by a wristpin and the other end rotatably mounted on the eccentric by a rod end cap where said gears and eccentric comprise a means for decreasing the inertial force created by the reciprocating mass of the piston and upper portion of the connecting rod as the piston approaches, reaches and passes the minimum combustion chamber volume position, said minimum combustion chamber volume position of the piston occurring when crankarm and connecting rod central axes are coplanar with the cylinder axis when viewed in cross section along the crankshaft axis.

3. An engine comprising a block assembly, a rotatable crankshaft mounted to the block assembly, said crankshaft comprising a driveshaft, crankarm(s) and crankarm pin, a stationary ring gear concentric with the axis of the driveshaft and rigidly attached to the block assembly, a rotatable pinion gear mounted concentrically on the crankarm pin, said pinion gear meshing with the stationary ring gear, a rotatable eccentric mounted on the crankarm pin and rigidly attached to the pinion gear, said eccentric and pinion gear rotating together in a direction opposite to the crankarm rotation, a cylinder with a central axis having an exhaust port and transfer port, a piston reciprocating in said cylinder, a connecting rod with one end rotatably mounted to the piston by a wristpin and the other end rotatably mounted on the eccentric by a rod end cap where said gears and eccentric comprise a means for decreasing the dwell time when the exhaust and transfer ports are open as the piston moves through the bottom portion of a piston stroke, said piston reaching its uppermost position in said cylinder when crankarm and connecting rod central axes are coplanar with the cylinder axis when viewed in cross section along the crankshaft axis.

* * * * *